United States Patent [19]

de Waal et al.

[11] Patent Number: 4,606,761
[45] Date of Patent: Aug. 19, 1986

[54] REDUCTION OF METAL COMPOUNDS

[75] Inventors: Jan C. de Waal; Peter W. E. Blom, both of Vereeniging, South Africa

[73] Assignee: Union Steel Corp. (of So. Africa) Ltd., South Africa

[21] Appl. No.: 675,729

[22] Filed: Nov. 28, 1984

[30] Foreign Application Priority Data

Nov. 29, 1983 [ZA] South Africa ............... 83/8881

[51] Int. Cl.$^4$ ............... C21C 5/52; C22B 4/00
[52] U.S. Cl. ............... 75/10.19; 75/10.22
[58] Field of Search ............... 75/10 R, 11, 65 R, 26

[56] References Cited

U.S. PATENT DOCUMENTS 3,140,168  7/1964  Halley ............... 75/26

Primary Examiner—Peter D. Rosenberg
Attorney, Agent, or Firm—Ostrolenk, Faber, Gerb & Soffen

[57] ABSTRACT

A method and apparatus for reducing a metal compound particularly iron oxide, by means of a reducing agent comprising CO or $H_2$ or a mixture of these two gases, of which the average temperature is between 850° C. and 1000° C. and which has been obtained at this temperature by means of a plasma arc heater. The CO and $H_2$ mixture is preferably obtained by heating a mixture comprising a selection of various reducing agents, including so called Sasol gas, and $CO_2$ and steam in a plasma arc heater and converting the mixture to CO and $H_2$.

13 Claims, 1 Drawing Figure

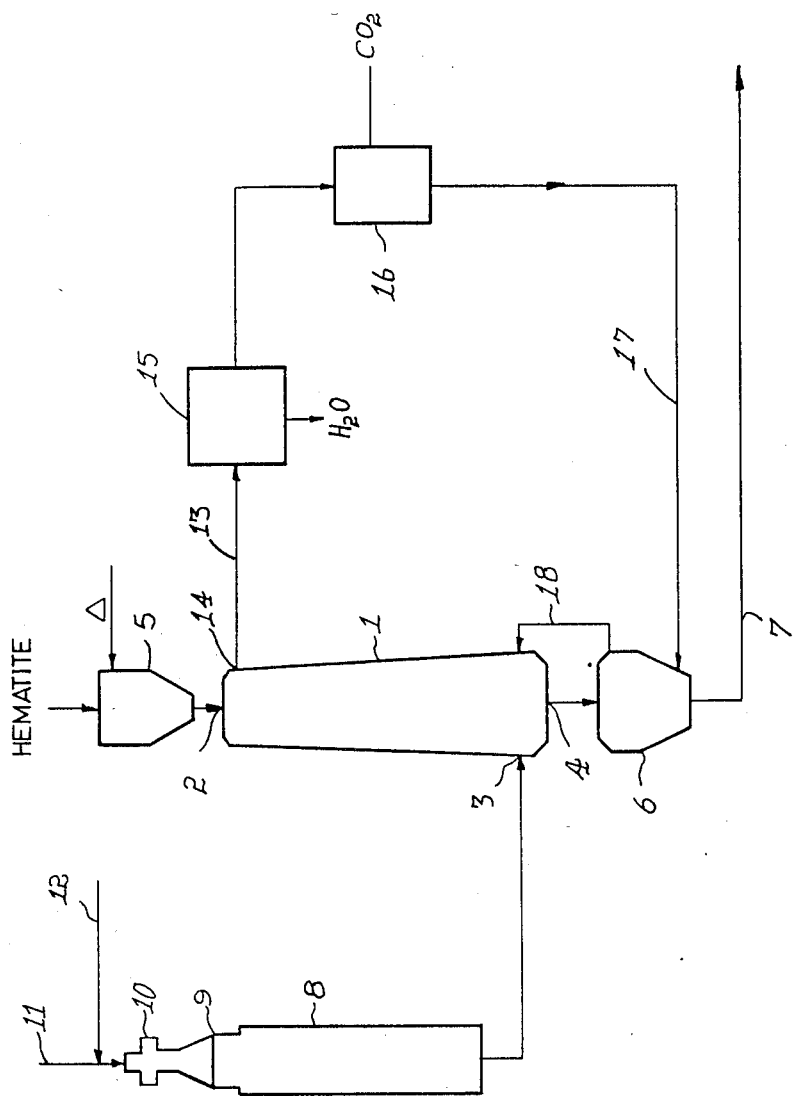

REDUCTION OF METAL COMPOUNDS

This invention relates to the reduction of metal compounds, particularly metal oxides such as iron oxide, for example.

The reduction of metal oxides is usually carried out by heating the metal oxides together with one or other reducing agent in solid form such as, for example, coal and/or coke, etc. The heating usually takes place in a blast furnace or in a suitable reactor provided with a gas heater or the like.

It is an object of this invention to provide a method and apparatus for the reduction of metal compounds which the applicant believes has certain advantages over the known methods and apparatus.

According to the invention a method for the reduction of a metal compound such as a metal oxide, for example, includes the step of reacting the metal compound with a reducing agent in gaseous form of which the average temperature is between 850° C. and 1000° C. and which comprises carbon monoxide or hydrogen, or a mixture of carbon monoxide and hydrogen, characterised in that the reducing agent is obtained at the aforesaid high temperature by means of an arc heater or the like.

Preferably the temperature of the gaseous reducing agent is increased to above 200° C. by means of the said arc heater or the like prior to reacting it with the metal compound.

Further according to one embodiment of the invention the aforesaid mixture of carbon monoxide and hydrogen is obtained by heating a suitable reducing agent such as, for example, liquid petroleum gas (LPG) and/or so called Sasol gas (a mixture of $H_2$, CO and $CH_4$ in a v/v ratio of approximately 48%, 23%, and 28% respectively) and/or a mixture of one or more suitable hydrocarbons and/or finely ground coal and/or a coal derived compound obtained from a coal liquefaction process and/or char and/or charcoal, together with steam and/or carbon dioxide in a plasma arc heater to a temperature sufficiently high to convert the particular combination of products to the aforesaid mixture of carbon monoxide and hydrogen.

In such a plasma arc heater, gas temperatures with an average of as high as 4000° C. can be achieved. These high temperatures are possible by achieving energy densities of as high as 2.4 $KwH/Nm^3$.

At these high temperatures and relatively low reaction pressure (approximately 3 Bar Absolute), non-catalytic gas conversion of the aforementioned combination of products to CO and $H_2$ takes place.

The char referred to above may, for example, be the product which is obtained when coal is charred by bringing it in direct contact with a heated gas mixture of carbon monoxide and hydrogen in the ratio of approximately 31% (v/v) to 69% (v/v) and a temperature of approximately 1000° C.–1200° C.

It is found that such a gas mixture does not react with the coal, not even at the aforesaid high temperature of approximately 1000° C. to 1200° C., and furthermore that the heat energy of the gas mixture is directly conveyed, with a small loss, to the coal.

Further according to the invention, the metal compound comprises iron ore in the form of pellets and/or raw ore which is reduced by the method according to the invention to sponge iron.

Preferably the iron ore is pre-heated prior to bringing it in contact with the particular reducing agent.

In this way maximum chemical use can be made of the reducing agent.

In the case where a gas mixture with a high hydrogen concentration (especially above 30% $H_2$) is used as the reducing agent, pre-heating the ore is a prerequisite.

The exact $H_2/CO$ constitution of the reducing gas which is used for the direct reduction of the iron ore depends on the source of such gas.

If the reducing gas is a gas mixture which has the ideal constitution of $H_2=20-25\%$ and $CO=80-75\%$ (v/v), the reduction reaction can be performed adiabatically and no temperature control is required.

Where so called Sasol gas is used as reducing gas, the product which is formed in the arc heater for use in the direct reduction reaction comprises approximately 72% (v/v) $H_2$ and 28% (v/v) CO. In this case, the temperature of the reduction reaction is in the order of 850° C. to 1000° C.

If Sasol gas and steam are used in such quantities that the steam/$CH_4$ ratio is in the order of 1.1 to 1, the gas mixture which is formed in the arc heater need not be cooled before it is used in the direct reduction reaction because there will then be very little excess steam present in the gas mixture.

Preferably the gas conversion reaction takes place in a reaction chamber (hereinafter called a gas converter) which is located adjacent the arc heater.

Further according to the invention, the gas converter is lined on its inside with special brick work which is resistant to high temperatures and thermal shocks.

Preferably the gas converter has an effective L/D ratio (the ratio between effective length and inside diameter) which varies beween approximately 5/1 and 10/1 depending on the gas or gas mixture which has to be converted in it.

Still further according to the invention the gas converter is connected to the plasma arc heater by means of a sliding vlave.

Such a valve not only serves to facilitate the replacement of the electrodes in the arc heater (applicant has found that such replacement can be carried out within 2 hours), but it also serves to isolate the gas converter from the rest of the apparatus.

Applicant has furthermore found that the plasma arc heater in the method according to the invention has a thermal efficiency of 88% and, if the reducing gas which has to be converted comprises a hydrocarbon such as $CH_4$ and steam, the gas reformer has a chemical efficiency of as high as 95%.

BRIEF DESCRIPTION OF THE DRAWING

The process flow diagram shows a simplified lay out of a direct reduction plant suitable for the production of 340,000 tons sponge iron per year with a method according to the invention by making use of so called Sasol gas and methane as the reducing gas.

In this diagram, the apparatus comprises a direct reduction shaft 1 with a top inlet 2 through which iron ore (hematite) flows into the shaft at a rate of approximately 57.0 ton/hour and a bottom inlet 3 through which a gas mixture of approximately 72% $H_2$ and 28% CO (v/v), which is at a temperature in the order of 900° C.–1000° C., flows into shaft 1 at a rate of approximately 45,700 $Nm^3/h$ (Normal cubic meter/hour). The iron ore is accordingly reduced in shaft 1 to sponge iron and the sponge iron flows at a rate of approximately 44 ton/hour out of shaft 1 through bottom outlet 4.

The iron ore is heated in a suitable manner in chamber 5 before it flows into shaft 1 through inlet 2 and the sponge iron which flows out through bottom outlet 4 can be cooled in a suitable manner in chamber 6 before it is collected via stream 7.

The gas mixture which flows in through inlet 3 is obtained from three gas converters 8 (of which only one is shown in the diagram) which is each connected by means of a sliding valve 9 to one of three 8.5 MW plasma arc heaters 10 (of which only one is shown in the diagram) through which a mixture of steam, which is provided at a rate of 3900–4000 $Nm^3/h$ from line 11, and Sasol gas and methane which is provided at a rate of 13300–13400 $Nm^3/h$ from line 12, flows. Each of gas converters 8, of which the inside walls are lined with brick work which is resistant to high temperature and thermal shocks, has an effective L/D ratio in the order of 7/1.

The gas mixture which is provided along line 12 is preheated to a temperature of approximately 150°–250° C. in a heat exchanger (not shown) which is fed by steam which is generated by means of off heat in the off gas stream 13 which leaves shaft 1 through a top outlet 14.

The off gas in stream 13 can be upgraded further by the removal of the water vapour and contaminents in chamber 15 and $CO_2$ in chamber 16 and can after heating and compression be send back as such to shaft 1 via stream 17, chamber 6, and stream 18. In this manner the amount of incoming feed gas can be reduced by half. This circulating gas stream 17 is also used to recover the feelable energy in the sponge iron by reason of the fact that the gas is pre-heated and the sponge iron cooled by bringing the gas in direct contact with the sponge iron in chamber 6. The thermal efficiency of the process is accordingly increased.

It will be appreciated that the abovementioned description only serves as example and that the sizes of the arc heaters, the quantities of the gas mixture(s) etc., can vary.

It will also be appreciated that the invention includes within its scope apparatus for the direct reduction of a metal compound substantially as herein described.

It will be appreciated further that the method and apparatus according to the invention provides a system for the direct reduction of a metal compound without the use of a catalyst or the like. Furthermore, the total energy utilization of the process is in the order of 9.5–10 GJ/ton sponge iron which is substantially less than what is possible with the existing systems. Furthermore, by operating the process according to the invention together with a coal liquefaction process, an economical interchange is possible in the sense that the process according to the invention provides a relatively cheap source of hydrogen for the coal liquefaction process while that part of the coal which is not liquefied in the latter can be employed usefully in the process according to the invention as a source of reducing agent.

It will also be appreciated that there are many other variations possible with a method and apparatus according to the invention which do not fall outside the scope of the appended claims. Thus, for example, by using different ratios $CH_4$(as well as other hydrocarbons, coal residue ect.), steam and $CO_2$ as feed mixture for the plasma arc/conversion system, a synthesis gas can be produced of which the $H_2$/CO ratios can vary between 1/1 and 3/1. Such a synthesis gas can not only be utilised advantageously in the reduction of metal compounds, but can also find wide application as synthesis gas in other processes, especially in the petro chemical industry of the synthesis of methanol and/or liquid petroleum gas.

We claim:

1. A method for the reduction of a metal compound including the step of reacting the metal compound with a reducing agent in gaseous form, said agent comprising a mixture of carbon monoxide and hydrogen which is obtained by heating at least one compound selected from the group consisting of liquid petroleum gas, Sasol gas, hydrocarbon, finely ground coal, a coal derived compound obtained form a coal liquefaction process, char and charcoal, together with at least one material selected from the group consisting of steam and carbon dioxide in a plasma arc heater.

2. The method of claim 1 wherein the temperature of the gaseous reducing agent is above 1200° C.

3. The method of claim 1 wherein the char is the product which is obtained when coal is charred by bringing it in direct contact with a heated gas mixture of carbon monoxide and hydrogen in the ratio of approximately 31% (v/v) to 69% (v/v) and a temperature of approximately 1000° C.–1200° C.

4. The method of claim 1 wherein the metal compound comprises iron ore.

5. The method of claim 4 wherein the iron ore is pre-heated prior to bringing it in contact with the reducing agent.

6. The method of claim 1 wherein the gas conversion reaction takes place in a gas converter which is located adjacent the arc heater.

7. The method of claim 6 wherein the gas converter is lined on its inside with special brick work which is resistant to high temperatures and thermal shocks.

8. The method of claim 6 wherein the gas converter has an effective L/D ratio between 5/1 and 10/1.

9. The method of claim 6 wherein the gas converter is connected to the plasma arc heater by means of a sliding valve.

10. The method of claim 1 wherein the temperature of the gaseous reducing agent is at least 850 degrees C.

11. A method for preparing a reducing agent in gaseous form comprising carbon monoxide and hydrogen for use in a method of reducing a metal compound therewith which method comprises heating a mixture of methane and at least one agent selected from the group consisting of steam and carbon dioxide in a plasma arc heater.

12. The method of claim 11 in which the temperature is at least 850 degrees C.

13. The method of claim 12 wherein the temperature is above 1200 degrees C.

* * * * *